Oct. 19, 1937. J. KATZMAN 2,096,674
ELECTRICAL CONDENSER AND THE OPERATION THEREOF
Original Filed Aug. 8, 1933
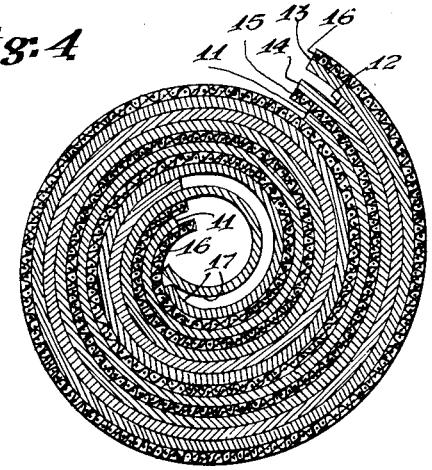
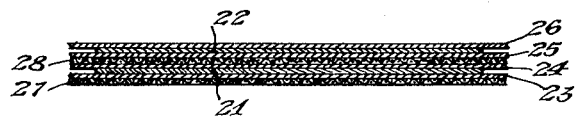
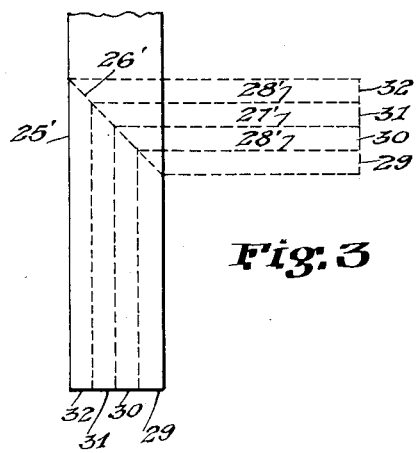
INVENTOR.
Jacob Katzman
BY
ATTORNEY.

Patented Oct. 19, 1937

2,096,674

UNITED STATES PATENT OFFICE 2,096,674

ELECTRICAL CONDENSER AND THE OPERATION THEREOF

Jacob Katzman, Brooklyn, N. Y., assignor to Nova Electric Corporation, New York, N. Y., a corporation of New York Original application August 8, 1933, Serial No. 684,164. Divided and this application March 13, 1935, Serial No. 10,825

11 Claims. (Cl. 175—315)

The present application which is a division of my application Serial No. 684,164, filed August 8, 1933, relates to electrical condensers and the operation of the same.

As is well known to those skilled in the art, it is desirable to use the thinnest possible foil in order to maintain at a minimum the size and cost of the condenser. These foils are usually separated by a fabric used as a carrier for the impregnating electrolyte. The limitation to the thinness of the foil which can be used is determined by the tendency of the foil, when it becomes too thin, to buckle and enter the interstices of the fabric, thus tending to short-circuit the condenser. Accordingly, it is necessary to use a sufficiently thick foil so that it will have the necessary stiffness to hold itself in place. With this it is often found necessary to use two layers of fabric on both sides of the foil to properly insulate the positive from the negative foil. The use of paper separator has also been proposed, but paper is not a good carrier for the electrolyte.

In the construction of condensers heretofore, it has been the practice to use layers of foil of about .003" thickness or more, separated by one or more layers of relatively thick gauze of about .005" thickness, which carries the electrolyte. When a short-circuit occurred in these condensers, the relatively thick foil tended to buckle inwardly at the point of the short-circuit, puncturing, spreading and tearing the strands of gauze. The foils on both sides of the gauze would thus contact with each other, producing a permanent short-circuit which rendered the condenser inoperative.

I have discovered that by providing separate means for the functions of conducting the electrolyte and of spacing, I can use much thinner layers of foil, and what is more important, I can prevent permanent short-circuits by causing the short-circuit to automatically burn itself out. Such separate functions, I have discovered, can best be performed by a combination of gauze and paper respectively.

Accordingly, an object of my invention is to provide a novel electrolytic condenser and method of operating the same.

A further object of my invention is to provide an electrolytic condenser using relatively thin foil.

Another object of my invention is to provide an electrolytic condenser which automatically "burns out" short circuits, preventing permanent short circuits.

Still a further object of my invention is to provide an electrolytic condenser using an impregnating means and a separate spacing means.

Still another object of my invention is to provide an electrolytic condenser using gauze as the impregnating means and paper as the support for the foil.

Still a further object of my invention is to provide novel means for cooling oil condensers.

Another object of my invention is to provide an electrolytic condenser which is compact, simple and cheap to construct, and which is sufficiently rugged to withstand and burn out short circuits.

There are other objects of my invention which together with the foregoing will appear in the detailed description which is to follow in connection with the drawing, in which:

Figure 1 is a cross-section of a preferred condenser developed and magnified considerably to clearly illustrate the construction.

Figure 2 is a cross-section shown in developed form of a modified form of my invention applied to oil condensers.

Figure 3 is a fragmentary view of a preferred form of bringing out the terminals; and Figure 4 is a cross-section showing the end construction of the condenser shown in Figure 1.

Referring to Figure 1, my preferred construction of condenser comprises two foils, a positive foil 11 and a negative foil 12. As shown, the negative foil 12 which is extremely thin, less than 1 mil thickness and of the order of ¼ mil in thickness, is sandwiched between layers of paper 13 and 14. This paper, which is preferably tissue paper, is in the range of ½ mil thickness.

The positive foil 11 which is approximately three mils thick, and which has been preformed in the usual manner well known in the electrolytic art, is sandwiched between two layers of gauze 15 and 16, approximately 5 mils thick. This unit thus assembled is impregnated with an electrolyte in the usual manner and then rolled into the standard form of electrolytic condenser so that when assembled, the condenser comprises a positive foil 11, a layer of gauze 15, a layer of paper 14, an extremely thin negative foil 12, a layer of paper 14, and a layer of gauze 16, as shown in Figure 4.

As shown in this latter Figure 4, the ends of the gauze are overlapped as shown at 17. This provides a double layer at the end to prevent the end edges of the foil from cutting through and short circuiting the condenser. I have discovered that in order to use one layer of gauze, it is necessary to protect the end edges of the foil to prevent a large number of short circuits, particularly the inner edge. Several layers of gauze or paper must be used at the end.

The thin negative foil 12 is suitably supported and held rigidly in place by the thin layers of paper 13 and 14. The gauze in turn functions to absorb and hold the electrolyte such as ammonium glycerol borate; a solution of borax in glycerine, etc.

With my preferred construction of condenser, in the event that a short circuit momentarily occurs, the paper at the point of short circuit punctures in the well known manner. The relatively thin negative foil has a texture such that the heat generated by the current causes it to burn away from the edges of the puncture in the paper before the paper can be consumed by the heat, thus automatically healing the short circuit. This occurs susbtantially instantaneously with the short circuit, thus preventing the heavier positive foil from buckling.

I prefer to employ a relatively thin negative foil rather than a thin positive foil so that the negative foil will burn away to automatically burn out the short circuit. The burnt-away portion of the negative foil does not have any effect on the capacity of the condenser, as distinguished from the case where the positive preformed foil were to burn away. Such burnt-away spots on the positive preformed foil would affect the capacity of the condenser.

As will now be clear, with this construction it is possible to use extremely thin foil properly supported by the paper which acts to space the foil from the opposite foil. At the same time, the gauze properly carries the electrolyte.

When a surge of voltage occurs and a breakdown results, the thin negative foil tends to burn at the point of the short circuit before the adjacent paper is affected. The thin negative foil burns until the edges of the burnt portion are well spaced from the short circuit point, thus automatically burning out the short circuit and again rendering the condenser operative at a higher voltage. The condenser is accordingly operative for a higher break-down voltage as well as being self-healing. Moreover, as will now be obvious, it consumes less space and is less costly than the usual condenser.

When the positive foil is made the thinner foil, the current flowing as a result of the short circuit will automatically form an oxide coating insulation protecting as it at the same time burns away the foil from the short circuit.

In a further form of my invention disclosed in Figure 2, my condenser is shown as used for the high voltage oil condenser type. In this construction, each foil 21 and 22 is sandwiched between layers of paper 23, 24, 25 and 26. Interposed between the foils are also the gauze 27 and 28.

The gauze provides a comparatively easy path for the flow of oil through the condenser. As is well known, the thermal conductivity of the paper and oil, or paper and wax is so low that the heat generated is not dissipated fast enough and therefore the temperature continues to rise until a breakdown occurs. These points are known as hot spots. With my preferred construction, the ready flow of oil, which the gauze provides, prevents the formation of such hot spots.

Although I have shown one preferred form of my invention, it will be obvious that this is merely for purposes of illustration, and that my invention may take other forms. Thus, two types of condensers—electrolytic and oil—are described, but it will be obvious that my invention is applicable to electric condensers in general. Moreover, although for purposes of illustration, I show my positive foil thin and sandwiched between the paper, and sandwich the negative foil between the gauze, I have also found that I may use a finer meshed gauze to support the thin foil and eliminate the paper, or I may use a very porous paper, such as blotting paper and eliminate the gauze, or in place of the gauze any perforated insulator such as Celluloid. In the latter case, the perforations or pores in the Celluloid would be filled with the preferred electrolyte either by brush operations or automatically over rolls as described in greater detail in my co-pending application Serial No. 697,615, filed November 11, 1933. I may also use the negative foil which is extremely thin of, for example, ½ mil or less thickness, previously mounted on a paper support. One of the difficulties of this aluminum foil is in the connection thereto. In Figure 3, I have shown a preferred construction of terminal. As shown, I just fold a large sheet 25 integral with and extending from the end of the foil along the edge 26. I next fold it along the edges 27 and 28 so that thus folded, it forms an extension having layers 29, 30, 31 and 32, and thus sufficiently thick to provide a strong lead.

I claim:

1. An electrolytic condenser comprising a first cathode foil; a second anode foil; a spacer between said foils impregnated with an electrolyte; a second spacer of finer texture than the first impregnated spacer for supporting said first foil; the thickness of the first foil being sufficiently thinner than said second foil such that upon a short circuit, the first foil is rapidly consumed at the region of the short circuit by the heat generated by the resulting current flow before the electrolyte and spacer is affected by the heat for automatically burning away the short circuit.

2. An electrolytic condenser comprising a relatively thin cathode foil and a second thicker anode foil and a composite fibrous interlay interposed therebetween, said interlay including two superposed elements, one of relatively open mesh and high electrolyte-absorptive capacity, and the other of close texture and lower electrolyte-absorptive capacity, said thinner foil selectively clearing a short-circuited condition of the condenser, without affecting the capacitance thereof.

3. An electrolytic condenser comprising a relatively thin cathode foil and a second thicker anode foil and a layer of gauze and a layer of paper on one face of one foil, a similar layer of gauze and layer of paper on the other face of the foil, all in superposed relationship, said elements enrolled to form a convolute condenser structure, said thin foil selectively burning away at a short-circuit region to prevent a change in the electrical characteristics of the condenser.

4. In an electrolytic condenser having a negative electrode; a positive electrode; said negative electrode being of the order of one-quarter mil thick; a stiffening support for said negative electrode; and a layer of gauze interposed between said electrodes for conducting electrolyte to said electrodes.

5. In an electrolytic condenser having a negative electrode; a positive electrode of the order of .003 inch thick; said negative electrode being in the order of one-quarter mil thickness; paper of the order of one-half mil thick for supporting said negative electrode; and a layer of gauze interposed between said positive electrode and said paper for holding an electrolyte.

6. In an electrolytic condenser, a relatively thin cathode foil; a paper support therefor on both faces of said thin cathode foil; a positive foil and a relatively thick fibrous interlay between said foils as an electrolyte carrier, said thin foil quickly burning away at a short-circuit region to prevent a change in the electrical characteristics of the condenser.

7. An electrolytic condenser comprising a first metal layer; an electrolyte section juxtaposed against said first metal layer and having a predetermined capacitative relation therewith; and a second metal layer substantially thinner than said first metal layer; said second metal layer selectively burning away about the region of the short-circuit during operation of the condenser upon a short-circuited condition to terminate the short-circuit before heat generated by the short-circuit affects said electrolyte section.

8. An electrolytic condenser comprising a positive metal layer; an electrolyte section juxtaposed against said positive metal layer, and having a predetermined capacitative relation therewith; a negative metal layer substantially thinner than said positive metal layer, juxtaposed against said electrolyte section for conductively connecting therewith; said negative metal layer selectively burning away about the region of the short-circuit during operation of the condenser upon a short-circuited condition to terminate the short-circuit without decreasing the capacitance of the condenser.

9. An elecrolytic condenser comprising a first metal foil layer; an electrolyte section juxtaposed against said first metal foil layer and having a predetermined capacitative relation therewith; a second metal foil layer of the order of .00025 inch thick; said second metal foil layer selectively burning away about the region of the short-circuit during operation of the condenser upon a short-circuited condition to terminate the short-circuit before heat generated by the short circuit affects said electrolyte section.

10. An electrolytic condenser comprising a positive metal layer; an electrolyte section juxtaposed against said positive metal layer, and having a predetermined capacitative relation therewith; a negative metal layer of the order of .00025 inch thick, juxtaposed against said electrolyte section for conductively connecting therewith; said negative metal layer selectively burning away about the region of the short-circuit during the operation of the condenser upon a short circuited condition to terminate the short-circuit without decreasing the capacitance of the condenser.

11. An electrolytic condenser comprising a positive metal foil layer of the order of .003 inch thick; an electrolyte section juxtaposed against said positive metal foil layer and having a predetermined capacitative relation therewith; and a negative metal foil layer of the order of .00025 inch thick, juxtaposed against said electrolyte section for conductively connecting therewith; said negative metal foil layer selectively burning away about the region of the short circuit during operation of the condenser upon a short-circuited condition to terminate the short-circuit before heat generated by the short-circuit affects said electrolyte section and without decreasing the capacitance of the condenser.

JACOB KATZMAN.